United States Patent
Wolff et al.

(10) Patent No.: US 7,638,448 B2
(45) Date of Patent: Dec. 29, 2009

(54) LEAD-FREE NIOBIUM-BISMUTH-PHOSPHATE OPTICAL GLASS WITH A HIGH INDEX OF REFRACTION

(75) Inventors: Silke Wolff, Hueckeswagen (DE); Simone Monika Ritter, Mainz (DE); Ute Woelfel, Mainz-Laubenheim (DE)

(73) Assignee: Schott AG, Mainz (DE)

( * ) Notice: Subject to any disclaimer, the term of this patent is extended or adjusted under 35 U.S.C. 154(b) by 197 days.

(21) Appl. No.: 11/835,683

(22) Filed: Aug. 8, 2007

(65) Prior Publication Data

US 2008/0039309 A1  Feb. 14, 2008

(30) Foreign Application Priority Data

Aug. 12, 2006 (DE) ............ 10 2006 037 828
Feb. 16, 2007 (DE) ............ 10 2007 008 300

(51) Int. Cl.
*C03C 3/16* (2006.01)
*C03C 3/21* (2006.01)

(52) U.S. Cl. .......................... 501/45; 501/46

(58) Field of Classification Search ............ 501/45, 501/46
See application file for complete search history.

(56) References Cited

U.S. PATENT DOCUMENTS

| | | | | |
|---|---|---|---|---|
| 6,333,282 B1 * | 12/2001 | Nakahata et al. | ............... | 501/45 |
| 7,482,293 B2 * | 1/2009 | Tsai et al. | ............... | 501/46 |
| 7,501,366 B2 * | 3/2009 | Wolff et al. | ............... | 501/45 |
| 2004/0053768 A1 | 3/2004 | Bourova et al. | | |
| 2005/0113239 A1 | 5/2005 | Miyata et al. | | |
| 2005/0202952 A1 | 9/2005 | Fujiwara et al. | | |
| 2007/0042891 A1 * | 2/2007 | Ritter et al. | ............... | 501/46 |

FOREIGN PATENT DOCUMENTS

| | | |
|---|---|---|
| EP | 1 078 894 | 2/2001 |
| JP | 62128946 | 6/1987 |
| WO | 03/062162 | 7/2003 |

* cited by examiner

*Primary Examiner*—Karl E Group
(74) *Attorney, Agent, or Firm*—Michael J. Striker

(57) ABSTRACT

The lead-free optical glass can be used in the fields of imaging, sensor technology, microscopy, medical technology, digital projection, photolithography, laser technology, wafer/chip technology, as well as of telecommunications, optical communication engineering and optics/lighting in the automotive sector. It has a refractive index $n_d$ of $1.82 \leq n_d \leq 2.00$ and/or an Abbe number $v_d$ of $18 \leq v_d \leq 28$ with good chemical stability, excellent crystallization stability and the following composition, in wt. based on oxide content, of:

| | |
|---|---|
| $P_2O_5$ | 12-35 |
| $Nb_2O_5$ | 30-50 |
| $Bi_2O_3$ | 2-13 |
| $GeO_2$ | 0.1-7 |
| $Li_2O$ | $\leq 6$ |
| $Na_2O$ | $\leq 6$ |
| $K_2O$ | $\leq 6$ |
| $Cs_2O$ | $\leq 6$ |
| $MgO$ | $\leq 6$ |
| $CaO$ | $\leq 6$ |
| $SrO$ | $\leq 6$ |
| $BaO$ | 7-<17 |
| $ZnO$ | $\leq 6$ |
| $TiO_2$ | $\leq 7$ |
| $ZrO_2$ | $\leq 7$ |
| $WO_3$ | 2-14 |
| F | $\leq 6$. |

19 Claims, No Drawings

LEAD-FREE NIOBIUM-BISMUTH-PHOSPHATE OPTICAL GLASS WITH A HIGH INDEX OF REFRACTION

CROSS-REFERENCE

The subject matter of the invention disclosed herein below is also disclosed in German Patent Application DE 10 2006 037 828.8, filed Aug. 12, 2006, in Germany and in German Patent Application DE 10 2007 008 300.0-45, filed Feb. 16, 2007, in Germany. The aforesaid German Patent Applications provide the basis for a claim of priority of invention for the invention described herein below under 35 U.S.C. 119 (a)-(d).

BACKGROUND OF THE INVENTION

1. The Field of the Invention

The present invention relates to an optical glass, the production of such a glass, the use of such a glass, optical elements comprising the optical glass or preforms of such optical elements, and optical parts or components comprising such optical elements.

2. The Related Art

Conventional optical glasses of the optical position claimed here (extreme hard flint and lanthanum hard flint position) generally contain PbO in order to achieve the desired optical properties, i.e. preferably a refractive index $n_d$ of $1.82 \leq n_d \leq 2.00$ and/or an Abbe number $v_d$ of $18 \leq v_d \leq 28$, but particularly in order to achieve the high refractive index. These glasses are therefore chemically not very stable.

$As_2O_3$ is furthermore often used as a fining agent. Since the glass components PbO and $As_2O_3$ have become regarded as environmentally unfriendly in recent years, most manufacturers of optical instruments and products tend to use lead-free and arsenic-free glasses in preference. For use in high price products, glasses with increased chemical stabilities are also constantly gaining importance.

Known lead-free glasses of the hard flint or lanthanum hard flint position, with a high refractive index and a low Abbe number, generally contain large amounts of $TiO_2$ in a silicate matrix, which leads to extreme crystallization instabilities and therefore to glasses which are often not workable in a secondary molding step. Also glasses containing $TiO_2$ are very difficult to process mechanically.

Instead of the hitherto customary machining of optical components from glass in block or ingot form, production methods in which direct pressings, i.e. precision-pressed optical components and/or preforms for re-pressing which are as close as possible to the final contour, so-called "precision gobs", can be obtained directly at the end of melting the glass, have recently been gaining importance. "Precision gobs" generally means preferably fully fire-polished, semi-free- or free-formed glass portions, which can be obtained via various production methods.

For this reason the need for "short" glasses, i.e. for glasses whose viscosity changes very strongly with temperature, has been reported more and more in the context of melting and molding process technology. This method has the processing advantage that it is possible to reduce the molding times, and therefore the mold closure times, in precision molding close to final geometry. In this way on the one hand the throughput is increased, and on the other hand the mold material is spared, which has a very positive effect on the overall production costs. Furthermore, owing to the faster solidification thereby obtained, it is also possible to work glasses with a stronger susceptibility to crystallization than in the case of correspondingly longer glasses, and pre-nucleation, which could be problematic in later secondary molding steps, is avoided or at least drastically reduced.

For the same reason, there is likewise a need for glasses whose temperature-viscosity profile in absolute terms comprises low temperatures in the molding range. Through lower process temperatures, this also contributes to increased mold lifetimes and, through fast stress-free cooling, to low pre-nucleation rates. This also offers a greater range of potentially more cost-effective mold materials, which is significant particularly in precision molding close to final geometry.

The prior art to be considered in view of the present invention is JP 92027180 B (Hoya Corp.), US 2004-053768 A (Alcatel), US 2005-0202952 (Hoya Corp.) and WO 03/062162 (Ohara).

According thereto, it is possible to produce glasses with a similar optical position or comparable chemical composition, although they show significant disadvantages in direct comparison with the glasses according to the present invention:

JP 92027180 B discloses an optical tellurite-phosphate glass, probably of a similar optical position. Because of the obligatory content of network-forming tellurium and lead oxide, the glass however has—besides its high toxicity which is also present in the glass batch and the raw material—a temperature-viscosity profile that prevents its use for precision molding (length of the glass).

US 2004-053768 A discloses glass compositions for Raman active fiber core glass. These glass compositions necessarily have a high silicate content (30-90 Mol %) and preferred embodiments contain only four components. Besides the only exceedingly small obtainable refractive index this glass has very high absolute viscosity and a length that excludes a processing via precision molding. Furthermore glass with a high silicate content and few further components tends to crystallize and is thus difficult to handle in secondary precision molding processes of optical components/parts (lenses, prisms, and others).

US 2005-0202952 discloses a glass system for precision molding, which in contrast to the glass of the present invention has the disadvantage of a higher tendency towards crystallization. The reason for this is based on the obligatory silicate content of up to 4 Mol %. In principle $SiO_2$ (in contrast to $Bi_2O_3$ and/or $GeO_2$) leads to solubility problems in phosphate matrices, so that its network forming effect (known from different glass systems) is converted into the opposite effect and crystallization, especially in secondary precision molding processes, but also in the melt during primary precision molding, is promoted. Furthermore a light scattering, colloidal precursor is produced already before crystallisation, which precursor remarkably reduces at least the transmission of the glass. Additionally $SiO_2$ decreases the achievable refractive index and dispersion.

WO 03/062162 discloses a niobium barium phosphate glass. This glass is stabilized against devitrification according to the mentioned examples using at least $SiO_2$ and/or $B_2O_3$. The glass of WO 03/062162 has the following disadvantages in contrast to the glass according to the present invention, which need to be taken into account. If $SiO_2$ is used in a phosphate glass system, the disadvantages regarding crystallization, optical position and transmission already discussed in US 2005-0202952 result. The use of $B_2O_3$ is forbidden in high quality optical phosphate glass because of crucible dwelling time: in connection with the glass that is already very reactive to flameproof materials, because of their phosphate matrix, this effect is even increased drastically with the use of $B_2O_3$ (notably in combination with $Li_2O$) and the crucible dwelling time is extremely shortened. The additional colloidal transfer of the crucible material in the melt strongly decreases the transmission over the whole wavelength range. If the material of the crucible is platinum, a platinum alloy or a related alloy, dissolved contents of metal ions further will decrease the transmission through specific absorption. This effect is often observed at the "blue edge" of the spectral range, which is sensitive anyway. Moreover the obligatory $B_2O_3$ content restricts the achievable optical position of the glass to low refractive indexes and dispersions. For the technical glasses claimed according to this state of the art especially refractive index and transmission lowering effects are of no importance, quite contrary to the importance such effects have on the optical glasses according to the present invention.

SUMMARY OF THE INVENTION

It is therefore an object of the present invention to provide an optical glass, which avoids the aforesaid problems of the aforementioned prior art glass and which facilitates the desired optical properties. This optical glass should preferably be workable via the precision pressing method and should have a low transition temperature. It should furthermore be readily meltable and workable, and have sufficient crystallization stability for a secondary molding step and/or manufacture in continuously run plants. A glass, which is as short as possible in a viscosity range of $10^{7.6}$ to $10^{13}$ dPas, is furthermore desirable.

The above object is achieved by the embodiments of the present invention, which are claimed and described in the claims appended herein below.

According to the present invention lead-free optical glass has a composition, in wt. % based on oxide content, of:

| | |
|---|---|
| $P_2O_5$ | 12-35 |
| $Nb_2O_5$ | 30-50 |
| $Bi_2O_3$ | 2-13 |
| $GeO_2$ | 0.1-7 |
| BaO | 7-<17 |
| $WO_3$ | 2-14. |

In preferred embodiments an optical glass is provided, which has the following composition, in wt. % based on oxide content, of:

| | |
|---|---|
| $P_2O_5$ | 12-35 |
| $Nb_2O_5$ | 30-50 |
| $Bi_2O_3$ | 2-13 |
| $GeO_2$ | 0.1-7 |
| $Li_2O$ | ≤6 |
| $Na_2O$ | ≤6 |
| $K_2O$ | ≤6 |
| $Cs_2O$ | ≤6 |
| MgO | ≤6 |
| CaO | ≤6 |
| SrO | ≤6 |
| BaO | 7-<17 |
| ZnO | ≤6 |
| $TiO_2$ | ≤7 |
| $ZrO_2$ | ≤7 |
| $WO_3$ | 2-14 |
| F | ≤6. |

The glasses according to the present invention have a refractive index $n_d$ of $1.82 \leq n_d \leq 2.00$, preferably $1.84 \leq n_d \leq 1.98$ and more preferably $1.88 \leq n_d \leq 1.94$, and/or an Abbe number ($v_d$) of $18 \leq v_d \leq 28$, preferably $19 \leq v_d \leq 26$ and more preferably $19 \leq v_d \leq 24$.

Unless otherwise indicated at the corresponding point, the expression "X-free" or "free of a component X" means that the glass essentially does not contain this component X, i.e. such a component is present at most as an impurity in the glass, but is not added as a separate component to the glass composition. X stands for any component, for example $B_2O_3$.

The term "optical position" is intended to mean the position of a glass in the Abbé diagram, which is defined by the values of $n_d$ and $v_d$ for the glass.

The basic glass system is a niobium-bismuth-phosphate glass, phosphate being used as a solvent for the niobium and bismuth oxides needed in order to adjust the desired optical position.

The glass contains phosphate i.e. $P_2O_5$ in a proportion of at least 12 wt. %, preferably at least 14 wt. %, more preferably at least 16 wt. %. The proportion of $P_2O_5$ is restricted to at most 35 wt. %, preferably at most 32 wt. %, particularly preferably at most 30 wt. %. With a phosphate level of more than approximately 35 wt. %, no more high-index components can be added to the glass at a level sufficient for the high refractive index.

The glass furthermore contains at least three components, which are used to increase the refractive index; in particular, the glass contains at least $Nb_2O_5$, $Bi_2O_3$ and BaO.

As a main or primary component to achieve the desired optical position and in particular the high refractive index, the glass contains $Nb_2O_5$ in a proportion of at least 30 wt. %, preferably at least 33 wt. %, more preferably at least 35 wt. % and at most 50 wt. %, preferably at most 49 wt. %, more preferably at most 48 wt. %. $Nb_2O_5$ contents of more than 50 wt. % entail the risk that the $Nb_2O_5$ will no longer fully dissolve in the matrix, and may thus cause crystallization of the melt.

In order to ensure solubility of the $Nb_2O_5$ in the glass matrix, the ratio of $Nb_2O_5$ to $P_2O_5$ should also be in a particular range. The $Nb_2O_5/P_2O_5$ ratio (in wt. %) is preferably at most 4.5, more preferably at most 3.5, most preferably at most 3.0. With $Nb_2O_5/P_2O_5$ ratios of more than 4.5, the glasses become unstable; devitrification occurs, presumably by demixing and/or crystallization. The $Nb_2O_5/P_2O_5$ ratio (in wt. %) is preferably at least approximately 0.7, more preferably at least 0.9, particularly preferably at least 1.2. Very low or significantly lower $Nb_2O_5/P_2O_5$ ratios would in fact be desirable with a view to the devitrification stability, but would demand much higher absolute phosphate contents so that it would not be possible to introduce enough high-index components such as $TiO_2$, $ZrO_2$ and BaO in order to achieve the refractive index position desired here and/or network modifiers, particularly oxides of divalent metals MO i.e. here the alkali earth metal oxides MgO, CaO, BaO, in order to adjust the desired shortness of the material.

This is the reason why additional high-index components that additionally show network forming properties, namely preferably $Bi_2O_3$ and $GeO_2$, are preferably added to the glass according to the present invention in order to achieve the desired refractive index position. So the material can be stabilized even at comparably higher $Nb_2O_5/P_2O_5$ ratios.

As a second main component or secondary component to achieve the desired refractive index position, besides $Nb_2O_5$ the glass according to the invention also contains the high-index $Bi_2O_3$ in a proportion of at least 2 wt. %, preferably at least 4 wt. % and at most 13 wt. %, preferably at most 11 wt. %. With $Bi_2O_3$ contents of less than 2 wt. %, it would not be possible to achieve the desired high refractive index. Additionally $Bi_2O_3$ with its properties as a network former promotes additional creation of network structures. These in turn promote stabilization against crystallization tendencies during precision molding processes, observed in niobium phosphate glasses without additional network formers. With contents of less than 2 wt. % this effect could not be achieved. Contents of more than 13 wt. % on the other hand would strengthen the network so much that unwanted effects concerning the temperature viscosity properties would occur. The glasses would become long and hence loose their eligibility for precision molding.

As a third main component or tertiary component to achieve the desired refractive index position, besides $Nb_2O_5$ and $Bi_2O_3$ the glass according to the present invention additionally contains the also network forming $GeO_2$ in a proportion of at least 0.1 wt. %, preferably at least 0.5 wt. % and at most 7 wt. %, preferably at most 1 wt. %. With proportions smaller than 0.1 wt. % this effect could not be achieved, also the optical position with high refractive index and high dispersion (small Abbe number) could not be achieved. Contents of more than 7 wt. % on the other hand would strengthen the network so much that unwanted effects concerning the temperature viscosity properties would occur. The glasses would become long and hence loose their eligibility for precision molding.

Although $Nb_2O_5$ no longer dissolves fully in the matrix in a proportion of more than 50 wt. % and may cause crystallization of the melt, surprisingly mixtures of up to 50 wt. % $Nb_2O_5$ with up to 7 wt. % $GeO_2$ and/or with up to 13 wt. % $Bi_2O_3$ still dissolve well even at such a high level.

As further components for achieving or fine adjusting the desired optical position the glass according to the present invention contains the high index but not network stabilizing components BaO and $WO_3$. These components essentially contribute to the adjustment of the viscosity temperature profile (short glasses) suitable for precision molding via their network modifying character.

The alkali earth metal oxide BaO is used in a proportion of at least 7 wt. %, preferably at least 9 wt. % and at most <17 wt. %, preferably at most 16 wt. % and more preferably at most 15 wt. %. With BaO contents of less than 7 wt. % the high refractive index could not be achieved despite the niobium, bismuth and germanium oxide contents. Especially the "steepness" needed for precision molding glass could not be achieved. With BaO contents of 17 wt. % and more on the other hand the occurring network destabilizing effect would be so strong that unacceptably high crystallizing tendencies would occur in the melt and at primary and secondary precision molding.

Tungsten oxide ($WO_3$) is employed in the glass according to the present invention in a proportion of at least 2 wt. %, preferably at least 4 wt. % and at most 14 wt. %, preferably at most 12 wt. %. Equivalent to the barium oxide, proportions inside this range are exclusively suitable to adjust the steepness needed for precision molding besides the adjustment of the desired optical position (high refractive index at high dispersion).

Added in small amounts, $TiO_2$ and $ZrO_2$ as further high index components might prove favorable for the glass according to the present invention. Thereby the proportion of every compound remains limited to at most 7 wt. % and preferably at most 5 wt. %. But preferably the sum of the contents of the components $TiO_2$ and $ZrO_2$ according to most of the embodiments of the present invention is limited to at most 7 wt. %. A limitation of these components is also desired in order not to increase the crystallization tendency of the glass and not to increase the hardness (e.g. characterized as Knoop hardness number or abrasiveness). This increase in hardness would prove very disadvantageous to cold finishing processes like grinding and polishing. Because of increased hardness, processing times and/or the tool abrasion would increase and hence the processing and the components' costs would rise. Thus according to preferred embodiments of the present invention, the glasses are free of $TiO_2$ and/or $ZrO_2$, preferably free of both components.

For the purpose of reducing the crystallization susceptibility of the glasses according to the present invention, a small ZnO content of at most 6 wt. % and preferably at most 4 wt. % may be added, which prevents or impedes the formation of a crystal structure. However ZnO levels of more than 6 wt. % reduce the refractive index so that the desired optical position cannot be achieved.

The alkali metal oxides $Li_2O$, $Na_2O$, $K_2O$ and $Cs_2O$ may be added to the glass according to the present invention for special application-specific adaptations, for example in order to make the glass suitable for ion exchange, for fine adaptation of the temperature viscosity profile or the optical position. The proportion of alkali metal oxides in total is preferably lower than 10 wt. %, more preferably at most 8 wt. %. Levels of 10 wt. % or more lead to an unacceptably strong influence in the direction of lower refractive indices, higher thermal expansion and/or "longer glasses" and crystallization due to increased ion mobility.

Some of the embodiments of glass according to the present invention contain $Li_2O$ in a proportion of at most 4 wt. %, preferably at most 2 wt. % and most preferably at most 1 wt. %. Some embodiments of the glass according to the present invention, however, are $Li_2O$-free. Lithium oxide contents of more than 4 wt. % are in general not desirable and lead to enhanced reactivity of the melt with respect to flameproof material. This leads to a strong ingress of flameproof material into the glass and to shorter equipment lifetimes. If platinum is used as a refractory material, this leads to transmission losses at the blue spectral edge and, as when using ceramic materials, to enhanced crystallization susceptibility in the melt as well as both primary and secondary molding by ingress of heterogeneous crystallization nuclei.

For fine adjustment of the viscosity temperature profile, the glasses according to the present invention may have a content of at most 6 wt. %, preferably at most 4 wt. %, of each of the oxides of divalent metals of the group MO, i.e. MgO, CaO, SrO and/or ZnO. Still more preferably the amount of these oxides is in total 8 wt. %. A "forced mixture" obtained using this method makes it possible to decrease the crystallization susceptibility of the glass through antagonistic behavior.

Fluoride is, if at all, only present in an amount of up to 6 wt. %, preferably up to 4 wt. % and more preferably up to 2 wt. %. Fluoride can be present in very small amounts (ppm) in order to mask color effects. Preferably the glass is free of this component.

Exceeding this upper limit for MO and F would have a detrimental effect on the viscosity temperature profile (glasses which are too short) and depart from the desired optical position by significantly reducing the refractive index and Increasing the Abbe number.

Special embodiments of the glass according to the present invention are also preferably free of $B_2O_3$. $B_2O_3$ has a detrimental effect on the glass, particularly in combination with platinum melting equipment. $B_2O_3$ per se causes an increase of the ion mobility in the glass, which leads to enhanced devitrification susceptibility. This effect is exacerbated in combination with melting in a platinum crucible, since, because of its reactivity with respect to the crucible material, $B_2O_3$ increases the introduction of heterogeneous platinum nuclei. The increased platinum introduction into the glass also deteriorates the transmission, particularly in the blue spectral range.

Since the glass according to the present invention is redox-sensitive, shifting the conditions towards reducing conditions while melting can cause a strong coloration of the glass due to resulting colloidal particles. In order to counteract this effect and avoid a melt that is too reducing, the glass according to the present invention contains $Sb_2O_3$ in a proportion of at least 0.1 wt. %, preferably at least 0.2 wt. %, and at most 2 wt. %, preferably at most 0.8 wt. %. This component is thus used only secondarily as a fining agent and serves primarily to ensure oxidative melting conditions. Yet since $Sb_2O_3$ has an intrinsic absorption, the level of 2 wt. % should not be exceeded. The higher the $Sb_2O_3$ level is, the more strongly the absorption edge in the blue spectral range is shifted towards higher wavelengths, so that chromatic aberrations in imaging the visible range may occur with increased amounts of $Sb_2O_3$. Preferred embodiments are free of this component.

Besides $Sb_2O_3$, the glass according to the present invention may contain other conventional fining agents in small amounts. The sum of these other added fining agents is preferably at most 1 wt. %, these amounts being added further to the components of the remaining glass composition giving 100 wt.%. The following components may be used as further fining agents (in wt. % additionally to the remaining glass composition):

| | | |
|---|---|---|
| $As_2O_3$ | 0-1 | and/or |
| SnO | 0-1 | and/or |
| $SO_4^{2-}$ | 0-1 | and/or |
| NaCl | 0-1 | and/or |
| $F^-$ | 0-1. | |

For more flexible adjustment of a special optical position within the achievable optical position range, the glasses according to the present invention may also contain one or more oxides of the group $La_2O_3$, $Y_2O_3$, $Gd_2O_3$, $Ta_2O_5$, $Yb_2O_5$ in a total proportion of at most 5 wt. %, preferably at most 2 wt. %. Increasing the total content of components in this group $La_2O_3$, $Y_2O_3$, $Gd_2O_3$, $Ta_2O_5$, $Yb_2O_5$ beyond 5 wt. % would lead to losses in the transmission (due to $Y_2O_3$, $La_2O_3$, $Gd_2O_3$, $Yb_2O_5$) and/or increased devitrification susceptibility (due to $La_2O_3$).

According to most embodiments as an optical glass, the glass according to the present invention is preferably free of coloring and/or optically active, e.g. laser-active, components. According to a special embodiment of the present invention, when used as a base glass for optical filters or solid-state lasers, the glass according to the present invention may nevertheless contain coloring and/or optically active, e.g. laser-active components, in proportions of at most 5 wt. %.

According to most embodiments, the glass according to the present invention preferably does not contain aluminium oxide. According to a particular embodiment of the present invention, however, the glass is also suitable for ion exchange processes. According to this embodiment, it is preferable for the glass to contain $Al_2O_3$. A low $Al_2O_3$ proportion of at most 6 wt. % promotes the formation of a structure in the material, which is also conducive to ion exchange by increasing the ion mobility. Increasing the $Al_2O_3$ content beyond 6 wt. %, however, would lead to increased devitrification susceptibility and undesired "length" of the glass, and is therefore not preferred. A glass according to this embodiment may also contain silver oxide in a proportion of 5 wt. %, preferably 2 wt. %. Increasing the silver oxide content beyond 5 wt. %, however, would lead to losses in the transmission of the glass.

According to one embodiment of the present invention, the glass is free of environmentally unfriendly components, for example lead and/or arsenic.

According to another embodiment of the present invention, the glass according to the present invention is also preferably free of other components not mentioned in the claims and/or this description, i.e. according to such an embodiment the glass consists essentially of the said components. The expression "essentially consist of" in this case means that other components are present at most as impurities, but are not deliberately added as separate components to the glass composition.

According to one embodiment of the present invention the glass according to the present invention preferably consists of from 90 to 95 wt. %, more preferably 98 wt. % of the glass, most preferably 99 wt. % of the above-mentioned said components.

According to one embodiment, the glass according to the invention is "contamination-free", i.e. it contains essentially no compounds which are introduced as an impurity (impurities) by the melting process. In particular, the glass is contamination-free with respect to $SiO_2$ and also contamination-free with respect to residues of metallic crucible materials, especially $Pt^{0/I}$, Au, Ir or alloys of these metals. The expression "contamination-free" means that these components are neither added as components to the glass batch nor introduced into the glass as an impurity by crucible corrosion while melting the glass. The expression "contamination-free with respect to $SiO_2$" means that the glass contains at most 0.1 wt. % $SiO_2$, preferably at most 500 ppm.

The expression "contamination-free with respect to residues of metallic crucible materials" means that the glass contains at most 100 ppm, preferably at most 60 ppm, of such residues of metallic crucible materials. Glass according to this embodiment has a significantly increased transmission together with a greatly increased crystallization stability. The increased crystallization stability is in this case based on the absence of heterogeneous $SiO_2$ and/or metallic crystallization nuclei, which are usually introduced to the melt by the respectively selected crucible material. A reduction in the transmission throughout the entire band range is avoided by the absence of scattering colloidal $Pt^0$ particles and scattering silicate particles and microcrystallization based thereon. The absence of $Pt^I$ which absorbs through its band spectrum, or similar metal ions, also results in an improved transmission. The glass according to this embodiment can be obtained by suitable process control. In particular, the melting crucible or the melting trough must be cooled sufficiently so that a coating of the glass forms on the surface of the melting trough and the glass melt per se has essentially no contact with the surface of the crucible or trough, and the coating serves to protect against impurities from the crucible or trough.

All glass according to the present invention has a Tg of at most 660° C., is crystallization-stable and can be worked well.

All glass according to the present invention has anomalous relative partial dispersions $\Delta P_{g,F}$ greater than or equal to $130 \times 10^{-4}$ on measurement samples obtained by cooling with a cooling rate of about 7 K/h, i.e. it is highly suitable for an optical color correction in color imaging systems.

All glass according to the present invention has specific densities ρ of less than or equal to 4.7 g/cm³. Because of its low carrying mass as considered relatively, the optical elements and/or optical components made from it is therefore particularly suitable for mobile/portable units.

All glass according to the present invention has a thermal expansion coefficient α of at most $11 \times 10^{-7}/K$ in the range of from 20 to 300° C. It therefore differs significantly from known phosphate glass, which has problems with thermal stress in reworking and assembly technology because of its extremely high thermal expansion, in the vicinity of about $14 \times 10^{-7}/K$.

All the glass according to the present invention furthermore has good chemical stability and stability against crystallization, i.e. crystallization stability. It is furthermore distinguished by good meltability and flexible workability close to final geometry, low production costs due to reduced process costs, good ion exchange properties and good environmental friendliness.

Using the glass according to the present invention, an adjustment of the optical position, viscosity temperature profile and working temperatures has been achieved such that highly specified molding close to final geometry is ensured even with sensitive precision machines. A correlation of crystallization stability and viscosity temperature profile has furthermore been achieved so that further thermal processing of the glass is readily possible, for instance pressing or re-pressing, or ion exchange processes.

The present invention furthermore relates to a method for producing an optical glass, comprising the step that oxidizing conditions are set up in the melt.

According to one embodiment of the method according to the present invention, at least a significant proportion of a component, in particular at least 0.2 wt. %, is added as nitrate to the batch to be melted. For example, "0.2 wt. %" in the case of nitrate means that 0.2 wt. % of the corresponding metal oxide is recalculated as the same molar proportion of the corresponding nitrate and this proportion is added as nitrate to the melt batch. Nitrate oxidizes the fining agent per se in redox fining systems and is therefore preferably used when fining with $As_2O_3$ and/or $Sb_2O_3$.

An oxidizing gas may likewise be introduced into the melt in order to set up oxidative conditions in the melt, gases containing oxygen being preferred, e.g. air or pure oxygen.

The melting crucible or the melting trough may furthermore be cooled sufficiently so that a coating of the glass forms on the surface of the melting trough and the glass melt per se has essentially no contact with the surface of the crucible or trough, and the coating serves to protect against impurities from the crucible or trough.

The phosphate proportion is preferably added to the batch as a complex phosphate, i.e. phosphate is added not in the form of free $P_2O_5$ but as a compound with other components, for example as a phosphoric acid derivative such as $Ba(H_2PO_4)_2$.

The present invention furthermore relates to the use of the glasses according to the invention for the application fields of imaging, sensor technology, microscopy, medical technology, digital projection, telecommunication, optical communications engineering/information transmission, optics/lighting in the automotive sector, photolithography, steppers, excimer lasers, wafers, computer chips as well as integrated circuits and electronic devices which contain such circuits and chips.

The present invention furthermore relates to optical elements which comprise the glass according to the invention. Optical elements may in this case particularly be lenses, prisms, light guide rods, arrays, optical fibers, gradient components, optical windows and compact components. According to the invention, the term "optical element" also includes preforms of such an optical element, for example gobs, precision gobs and the like.

The present invention furthermore relates to a method for producing an optical element or an optical component, comprising the step of:
pressing the optical glass according to the present invention.

The pressing of the glass is preferably a precision pressing process.

According to one embodiment, the glass is worked into an optical component by re-pressing.

The term "precision pressing" is used according to the invention to mean a pressing method in which the surface of the optical component being produced no longer needs to be finished or polished after the precision pressing, but instead has an essentially sufficient surface quality.

In conventional pressing methods, the surface does not yet have a sufficient optical quality after pressing, and the pressed article must for example be polished before further use.

As a starting material, glass for a pressing method may be worked directly from the melt. In the case of precision pressing, the term precision molding is then used.

As an alternative to pressing from the glass melt, a solidified glass gob may be reheated; the pressing process in this case is a secondary molding process, which is also referred to as re-pressing. The demands on glasses for such re-pressing are very stringent. These glasses must be substantially more crystallization-stable than glasses which are processed directly from the melt and are not heated to the working temperature for a second time.

For re-pressing, it is possible to use gobs or sawed preforms. So-called precision gobs are also preferably used for precision pressing, i.e. solidified glass gobs whose weight already corresponds to the final weight of the optical component to be produced and whose shape is also preferably similar to the final shape of the optical component to be produced. In the case of such precision gobs, re-pressing does not leave a protruding burr of excess material, which would have to be removed in a further working step.

The invention furthermore relates to the use of such an element to produce optical parts, for example sensors, microscopy, medical technology, digital projection, telecommunication, optical communications engineering/information transmission, optics/lighting in the automotive sector, photolithography, steppers, excimer lasers, wafers, computer chips as well as integrated circuits and electronic devices which contain such circuits and chips.

The invention furthermore relates to optical parts, for example for imaging sensors, microscopy, medical technology, digital projection, telecommunication, optical communications engineering/information transmission, optics/lighting in the automotive sector, photolithography, steppers, excimer lasers, wafers, computer chips as well as integrated circuits and electronic devices which contain such circuits and chips, comprising the above-mentioned optical elements.

The present invention will be explained in more detail below by a series of examples. The present invention is not, however, restricted to the said examples.

EXAMPLES

Table II contains 13 exemplary embodiments in the preferred composition range, as well as two comparative examples. The examples of the glass according to the invention were produced as follows:

The raw materials for the oxides, preferably the corresponding carbonates, and the phosphate proportion, preferably as complex phosphate, are weighed out, one or more fining agents such as $Sb_2O_3$ are added and subsequently mixed well. The glass batch is melted at about 1200° C. in discontinuous batch melting equipment, subsequently refined (1250° C.) and homogenized. At a casting temperature of about 1000° C., the glass can be cast and worked to the desired dimensions. In large-volume continuous equipment, experience shows that the temperatures can be reduced by at least about 100 K and the material can be worked by the method of molding close to final geometry, for example precision pressing.

TABLE I

MELTING EXAMPLE OF GLASS BATCH CALCULATED FOR 100 KG (ACCORDING TO EXAMPLE 4, TABLE II)

| Oxide | wt. % | Raw material | Weigh-in (kg) |
|---|---|---|---|
| $P_2O_5$ | 22.0 | $P_2O_5$ | 9.75 |
|  |  | $Ba(H_2PO_4)_2$ | (see BaO) |
| $Nb_2O_5$ | 41.5 | $Nb_2O_5$ | 41.56 |
| $Bi_2O_3$ | 6.0 | $Bi_2O_3$ | 6.00 |
| $GeO_2$ | 2.0 | $GeO_2$ | 2.00 |
| BaO | 12.5 | $Ba(H_2PO_4)_2$ | 27.89 |
| $Li_2O$ | 1.5 | $Li_2CO_3$ | 3.73 |
| $K_2O$ | 2.0 | $K_2CO_3$ | 2.21 |
|  |  | $KNO_3$ | 1.07 |
| $Cs_2O$ | 2.5 | $Cs_2CO_3$ | 2.88 |
| ZnO | 0.5 | ZnO | 0.50 |
| $TiO_2$ | 2.5 | $TiO_2$ | 2.50 |
| $WO_3$ | 7.0 | $WO_3$ | 7.00 |
| $Sb_2O_3$ | 0.5 | $Sb_2O_3$ | 0.30 |
| Sum | 100.0 |  | 107.39 |

The properties of the examples of the glass according to the invention obtained in this way are reported in Table 11 as the properties of example 4.

TABLE II

Melting Examples 1-5 (in wt. %)

| | Examples | | | | |
|---|---|---|---|---|---|
| | 1 | 2 | 3 | 4 | 5 |
| $P_2O_5$ | 12.0 | 14.0 | 16.0 | 22.0 | 30.0 |
| $Nb_2O_5$ | 50.0 | 48.0 | 49.0 | 41.5 | 35.0 |
| $Bi_2O_3$ | 13.0 | 11.0 | 9.0 | 6.0 | 6.0 |
| $GeO_2$ | 6.0 | 7.0 | 2.0 | 2.0 | 1.0 |
| $Li_2O$ |  |  | 2.0 | 1.5 |  |
| $Na_2O$ |  |  |  |  |  |
| $K_2O$ |  |  |  | 2.0 |  |
| $Cs_2O$ |  |  |  | 2.5 |  |
| MgO |  |  |  |  |  |
| CaO |  | 1.5 | 1.0 |  |  |
| SrO |  |  | 2.0 |  |  |
| BaO | 7.0 | 16.5 | 15.0 | 12.5 | 9.0 |
| ZnO |  |  | 2.0 | 0.5 |  |
| $TiO_2$ |  |  |  | 2.5 | 5.0 |
| $ZrO_2$ |  |  |  |  |  |
| $WO_3$ | 12.0 | 2.0 | 2.0 | 7.0 | 14.0 |
| $Sb_2O_3$ |  | 0.3 |  | 0.3 |  |
| Sum | 100.0 | 100.3 | 100.0 | 100.3 | 100.0 |
| $n_{d\ [7K/h]}$ | 1.9586 | 1.9344 | 1.9671 | 1.9130 | 1.8877 |
| $v_{d\ [7K/h]}$ | 19.4 | 21.2 | 20.0 | 21.2 | 20.6 |
| $P_{g\text{-}F\ [7K/h]}$ | 0.6474 | 0.6379 | 0.6406 | 0.6363 | 0.6446 |
| $\Delta P_{g\text{-}F}$ $(10^{-4})_{[7K/h]}$ | 337 | 282 | 289 | 280 | 349 |

TABLE II-continued

| $\alpha_{20\text{-}300}$ $(10^{-6} \times K^{-1})$ | 8.8 | 7.9 | 6.8 | 7.1 | 7.9 |
|---|---|---|---|---|---|
| Tg (° C.) | 496 | 633 | 660 | 596 | 517 |
| $\rho$ (g/cm$^3$) | 4.46 | 4.42 | 4.37 | 4.14 | 3.99 |

Melting Examples 6-10 (in wt. %)

| | Examples | | | | |
|---|---|---|---|---|---|
| | 6 | 7 | 8 | 9 | 10 |
| $P_2O_5$ | 32.0 | 35.0 | 16.0 | 20.0 | 23.0 |
| $Nb_2O_5$ | 33.0 | 30.0 | 43.0 | 37.0 | 48.0 |
| $Bi_2O_3$ | 2.0 | 4.0 | 8.0 | 7.0 | 2.0 |
| $GeO_2$ | 0.5 | 0.1 | 1.0 | 0.5 | 2.0 |
| $Li_2O$ | 6.0 | 4.0 |  |  |  |
| $Na_2O$ |  |  |  | 1.0 |  |
| $K_2O$ |  |  |  | 6.0 | 1.0 |
| $Cs_2O$ |  |  |  |  | 6.0 |
| MgO | 1.5 |  |  |  |  |
| CaO |  |  |  | 4.0 | 6.0 |
| SrO |  |  |  |  |  |
| BaO | 16.0 | 12.0 | 15.0 | 16.0 | 9.0 |
| ZnO |  |  |  | 4.0 | 1.0 |
| $TiO_2$ |  | 7.0 |  |  |  |
| $ZrO_2$ | 5.0 |  | 7.0 | 2.5 |  |
| $WO_3$ | 4.0 | 7.9 | 10.0 | 2.0 | 2.0 |
| $Sb_2O_3$ | 0.3 |  |  |  | 0.3 |
| Sum | 100.3 | 100.0 | 100.0 | 100.0 | 100.3 |
| $n_{d\ [7K/h]}$ | 1.9194 | 1.9030 | 1.9239 | 1.9780 | 1.8953 |
| $v_{d\ [7K/h]}$ | 23.0 | 20.3 | 23.4 | 20.5 | 23.8 |
| $P_{g\text{-}F\ [7K/h]}$ | 0.6155 | 0.6406 | 0.6251 | 0.6324 | 0.6280 |
| $\Delta P_{g\text{-}F}$ $(10^{-4})_{[7K/h]}$ | 133 | 316 | 218 | 249 | 235 |
| $\alpha_{20\text{-}300}$ $(10^{-6} \times K^{-1})$ | 6.5 | 5.4 | 18.8 | 10.8 | 20.7 |
| Tg (° C.) | 632 | 625 | 411 | 479 | 464 |
| $\rho$ (g/cm$^3$) | 4.16 | 3.78 | 4.46 | 4.63 | 4.31 |

Melting Examples 11-13 and Comparative Examples A, B (in wt. %)

| | Examples | | | | |
|---|---|---|---|---|---|
| | 11 | 12 | 13 | A | B |
| $P_2O_5$ | 27.0 | 24.0 | 13.0 | 14.0 | 18.0 |
| $Nb_2O_5$ | 40.0 | 33.0 | 32.0 | 37.0 | 34.9 |
| $Bi_2O_3$ | 4.0 | 13.0 | 11.0 | 5.0 | 3.0 |
| $GeO_2$ | 4.0 | 0.1 | 2.5 | 3.0 | 0.1 |
| $Li_2O$ |  |  | 0.5 | 0.5 |  |
| $Na_2O$ | 0.5 | 1.5 |  | 4.0 | 6.0 |
| $K_2O$ | 0.5 |  | 1.5 | 2.5 | 4.0 |
| $Cs_2O$ | 4.0 |  | 1.0 | 3.0 |  |
| MgO |  |  |  | 4.0 | 6.0 |
| CaO |  |  | 0.5 |  | 2.0 |
| SrO |  | 1.0 | 6.0 | 4.0 |  |
| BaO | 7.0 | 16.5 | 16.0 | 10.0 | 17.0 |
| ZnO |  | 5.9 | 1.5 |  |  |
| $TiO_2$ |  | 1.0 | 1.5 | 3.0 | 2.0 |
| $ZrO_2$ |  |  | 1.0 | 4.0 |  |
| $WO_3$ | 13.0 | 4.0 | 12.0 | 6.0 | 7.0 |
| $Sb_2O_3$ |  |  |  |  |  |
| Sum | 100.3 | 100.0 | 100.0 | 100.0 | 100.0 |
| $n_{d\ [7K/h]}$ | 1.8448 | 1.8922 | 1.9694 | 1.9239 | 1.8953 |
| $v_{d\ [7K/h]}$ | 23.2 | 23.3 | 21.3 | 23.4 | 23.8 |
| $P_{g\text{-}F\ [7K/h]}$ | 0.6298 | 0.6302 | 0.6353 | 0.6251 | 0.6280 |
| $\Delta P_{g\text{-}F}$ $(10^{-4})_{[7K/h]}$ | 249 | 251 | 272 | 218 | 235 |
| $\alpha_{20\text{-}300}$ $(10^{-6} \times K^{-1})$ | 9.0 | 9.3 | 10.5 | 18.8 | 20.7 |
| Tg (° C.) | 530 | 550 | 416 | 411 | 464 |
| $\rho$ (g/cm$^3$) | 4.17 | 4.23 | 4.49 | 4.46 | 4.31 |

All glass examples 1 to 13 have a $SiO_2$ content of less than 0.1 wt. % and a content of less than 100 ppm of residues of the metallic crucible materials. They are distinguished by a high crystallization stability and excellent transparency.

The comparative examples A and B have glass compositions, for which, because of a high flux material content outside the composition ranges according to the present invention (the alkali metal oxide content is above 10 wt. %), a homogenous molten mass is indeed obtained, but microscopic devitrification occurs on cooling of the composition, so that a transparent glass ceramic material is generated. Nevertheless measurement of the optical data is possible. The phase transition becomes particularly obvious considering the escalating values for the thermal properties, in this case for example the thermal expansion coefficient.

The glass according to the invention has optical data in common with known optical glasses of this position. It is, however, distinguished by better chemical stability and machinability, lower production costs due to reduced raw material and process costs, sufficient crystallization stability owing to their shortness, and by good environmental friendliness. An adjustment of the crystallization stability and viscosity-temperature profile have been achieved by the glass according to the present invention as shown with examples (Table II) so that further thermal processing (pressing or re-pressing) of the glass is readily possible.

We claim:

1. A lead-free optical glass that is free of lead and has a composition, in wt. % based on oxide content, of:

| | |
|---|---|
| $P_2O_5$ | 12-35 |
| $Nb_2O_5$ | 30-50 |
| $Bi_2O_3$ | 2-13 |
| $GeO_2$ | 0.1-7 |
| BaO | 7-<17 |
| $Na_2O$ | 0-1.5 |
| $WO_3$ | 2-14. |

2. The glass according to claim 1, which is free of $B_2O_3$, free of contamination by $SiO_2$, and/or free of residues from metallic crucible materials.

3. The glass according to claim 1, wherein a sum total amount of $TiO_2+ZrO_2$ does not exceed 7 wt. %.

4. The glass according to claim 1, wherein an alkali metal oxide content, defined as a sum total amount of $Li_2O$, $Na_2O$, $K_2O$ and $Cs_2O$, is at most 8 wt. % and/or each of said $Li_2O$, $K_2O$ and $Cs_2O$ is present in an amount of up to 6 wt. %.

5. The glass according to claim 1, wherein a sum total amount of MgO, CaO, SrO and ZnO is at most 8 wt. % and/or each of said MgO, CaO, SrO and ZnO is present in an amount of up to 6 wt. %.

6. The glass according to claim 1, containing at most 6 wt. % of aluminium oxide.

7. The glass according to claim 1, containing at most 6 wt. % of zinc oxide.

8. The glass according to claim 1, containing at most 5 wt. % of $Ag_2O$.

9. The glass according to claim 1, containing up to 5 wt. % of a sum total amount of $La_2O_3$, $Y_2O_3$, $Gd_2O_3$, $Ta_2O_5$ and $Yb_2O_5$.

10. The glass according to claim 1, which is free of Pt and/or $SiO_2$.

11. The glass according to claim 1, containing a fining agent comprising

| | | |
|---|---|---|
| 0-1 wt. % of | $Sb_2O_3$ | And/or |
| 0-1 wt. % of | $As_2O_3$ | And/or |
| 0-1 wt. % of | SnO | And/or |
| 0-1 wt. % of | NaCl | And/or |
| 0-1 wt. % of | $SO_4^{2-}$ | And/or |
| 0-1 wt. % of | $F^-$. | |

12. The glass according to claim 1, having a refractive index $n_d$ of $1.82 \leq n_d \leq 2.00$ and/or an Abbe number $v_d$ of $18 \leq v_d \leq 28$.

13. A method of producing a glass comprising a step of setting up oxidizing conditions in a glass melt from which said glass is formed;
wherein said glass is free of lead and has a composition, in wt. % based on oxide content, of:

| | |
|---|---|
| $P_2O_5$ | 12-35 |
| $Nb_2O_5$ | 30-50 |
| $Bi_2O_3$ | 2-13 |
| $GeO_2$ | 0.1-7 |
| BaO | 7-<17 |
| $Na_2O$ | 0-1.5 |
| $WO_3$ | 2-14. |

14. A method of making an optical component comprising forming a lens, prism, light guide rod, array, optical fiber, gradient component and/or an optical window, wherein said optical component comprises a glass that is free of lead and has a composition, in wt. % based on oxide content, of:

| | |
|---|---|
| $P_2O_5$ | 12-35 |
| $Nb_2O_5$ | 30-50 |
| $Bi_2O_3$ | 2-13 |
| $GeO_2$ | 0.1-7 |
| BaO | 7-<17 |
| $Na_2O$ | 0-1.5 |
| $WO_3$ | 2-14. |

15. A method of making an optical part or an optical component comprising forming an optical part or an optical component for a sensor, microscopy, medical technology, digital projection, telecommunication, optical communications engineering/information transmission, optics/lighting in the automotive sector, photolithography, a stepper, an excimer laser, a wafer, a computer chip, an integrated circuit and/or an electronic device containing said integrated circuit and/or said computer chip, wherein said optical part or said optical component comprises a glass that is free of lead and has a composition, in wt. % based on oxide content, of:

| | |
|---|---|
| $P_2O_5$ | 12-35 |
| $Nb_2O_5$ | 30-50 |
| $Bi_2O_3$ | 2-13 |
| $GeO_2$ | 0.1-7 |
| BaO | 7-<17 |
| $Na_2O$ | 0-1.5 |
| $WO_3$ | 2-14. |

16. An optical element comprising a lens, a prism, a light guide rod, an array, an optical fiber, a gradient component and/or an optical window, said optical element comprising a glass that is free of lead and has a composition, in wt. % based on oxide content, of:

| | |
|---|---|
| $P_2O_5$ | 12-35 |
| $Nb_2O_5$ | 30-50 |
| $Bi_2O_3$ | 2-13 |
| $GeO_2$ | 0.1-7 |
| BaO | 7-<17 |
| $Na_2O$ | 0-1.5 |
| $WO_3$ | 2-14. |

17. A method of producing an optical element, comprising the step of pressing a glass that is free of lead and has a composition, in wt. % based on oxide content, of:

| | |
|---|---|
| $P_2O_5$ | 12-35 |
| $Nb_2O_5$ | 30-50 |
| $Bi_2O_3$ | 2-13 |
| $GeO_2$ | 0.1-7 |
| BaO | 7-<17 |
| $Na_2O$ | 0-1.5 |
| $WO_3$ | 2-14. |

18. An optical part or optical component for imaging, a sensor, microscopy, medical technology, digital projection, telecommunication, optical communications engineering/information transmission, optics/lighting in the automotive sector, photolithography, a stepper, an excimer laser, a wafer, a computer chip, an integrated circuit and/or an electronic device containing said computer chip and/or said circuit, said optical part or said optical component comprising a glass that is free of lead and has a composition, in wt. % based on oxide content, of:

| | |
|---|---|
| $P_2O_5$ | 12-35 |
| $Nb_2O_5$ | 30- |
| $Bi_2O_3$ | 2-13 |
| $GeO_2$ | 0.1-7 |
| BaO | 7-<17 |
| $Na_2O$ | 0-1.5 |
| $WO_3$ | 2-14. |

19. The glass according to claim 1, containing from 0 to 1.5 wt. % of $Li_2O$.

* * * * *